United States Patent [19]

Yats

[11] Patent Number: 4,550,131

[45] Date of Patent: Oct. 29, 1985

[54] AQUEOUS SLURRY PROCESS FOR PREPARING REINFORCED POLYMERIC COMPOSITES

[75] Inventor: Larry D. Yats, Clare, Mich.

[73] Assignee: The Dow Chemical Company, Midland, Mich.

[21] Appl. No.: 666,027

[22] Filed: Oct. 30, 1984

[51] Int. Cl.$^4$ .......................... C08K 3/40; C08K 7/14; C08L 1/00; B32B 17/08
[52] U.S. Cl. ..................................... 524/35; 524/521; 524/528; 524/494; 524/819; 524/522; 523/335
[58] Field of Search ................. 523/335; 524/35, 521, 524/528, 494, 819, 522

[56] References Cited

U.S. PATENT DOCUMENTS 4,426,470  1/1984  Wessling et al. ..................... 524/521

Primary Examiner—John Kight
Assistant Examiner—Marvin L. Moore
Attorney, Agent, or Firm—D. L. Corneglio

[57] ABSTRACT

An improved aqueous slurry process for preparing reinforced polymeric composites in the absence of a flocculant comprising the steps of forming an alkaline aqueous slurry comprising a reinforcing material, a heat fusible organic polymer and a binder comprising a salt of an ethylene acrylic acid copolymer having an acrylic acid content from about 12 to about 30 percent by weight copolymer solids and adjusting the pH value of the slurry such that the binder is destabilized to coagulate the slurry. A product formed by the improved process is also provided.

11 Claims, No Drawings

AQUEOUS SLURRY PROCESS FOR PREPARING REINFORCED POLYMERIC COMPOSITES

BACKGROUND OF THE INVENTION

This invention pertains to an improved aqueous slurry process for preparing reinforced polymer composites in the absence of flocculant by employing a salt of an ethylene acrylic acid copolymer as the binder. The subject binder is capable of being coagulated or destablized by adjusting the pH of the aqueous dispersion and therefore, eliminates the need of adding a separate flocculant.

The aqueous slurry process for preparing reinforced polymeric composites is well known in the art. In particular, the generally practiced processes employ wet-laid aqueous techniques with minor modifications to allow for the utilization of polymeric materials. Such procedures and processes are disclosed in U.S. Pat. Nos. 4,426,470 and 4,431,696. Additionally, foreign patents disclose the wet-laid aqueous procedures modified to produce polymeric composites. Such patents include U.K. Pat. No. 1,263,812; French Pat. Publication No. 2,507,123 and European Patent Office Publication No. 0,039,292 Al.

Typically, reinforced polymeric composites are prepared in a wet-laid aqueous procedure consisting of flocculating an aqueous suspension containing the ingredients of the mixture, dewatering the suspension and drying the mat to produce a reinforced polymeric sheet. The ingredients of the aqueous dispersion prior to flocculating generally comprise a binder, a heat fusible organic polymer and a reinforcing material. As explained in U.S. Pat. No. 4,426,470, the typical binders are aqueous colloidal dispersions of substantially water-insoluble organic polymers having anionic or cationic bound charges in an amount sufficient to provide stabilization of the colloid, but insufficient to cause the polymer to be water soluble. Representative organic polymers are natural rubber, and synthetic rubbers such as styrene/butadiene, isoprene and butyl rubbers. Additionally, latexes of a structured core/shell morphology are disclosed where the shell region has bound charges at or near the surface of the particle.

While the binders generally employed have proven to be adequate they require a flocculant or coagulant to destabilize the latex dispersion. Usually, partially hydrolyzed anionic polyacrylamide are employed for cationic systems and cationic modified polyacrylamide and diallyldiethylammonium chloride for anionic systems. It therefore would be desirable to eliminate the necessity to employ a flocculant but not adversely affect the properties of the reinforced polymeric composite.

It has been discovered that the basic procedures and methods for preparing a reinforced polymeric composite can be employed except that by employing a binder of an ionic stabilized aqueous dispersion, such as an ammonium salt of ethylene acrylic acid copolymers, the aqueous dispersion can be destabilized by a pH adjustment. This provides an advantage of eliminating the necessity for a flocculant and, in turn, simplifies the method of preparing a reinforced polymer composite.

SUMMARY OF THE INVENTION

In one aspect, the present invention is an improved process for preparing a polymeric composite in the absence of a flocculant comprising the steps of forming an alkaline aqueous slurry comprising a reinforcing material, a heat fusible organic polymer and a binder comprising a salt of an ethylene acrylic acid copolymer having an acrylic acid content from about 12 to about 30 percent by weight copolymer solids and adjusting the pH of the slurry such that the binder is destabilized to coagulate the slurry. Additionally, the process can include the steps of collecting the destablized slurry in the form of a mat, dewatering and drying.

Generally, the reinforcing fibers are glass fibers and the binder is an ethylene acrylic acid copolymer wherein the acrylic acid content of the copolymer of 20 percent by weight copolymer solids. The pH of the alkaline aqueous slurry is adjusted by adding an acid, such as acetic acid, in an amount sufficient to destabilize the binder.

In another aspect, the present invention is the process as described above wherein the alkaline aqueous slurry is formed in thickened water. Preferably, the thickened water is formed by adding sufficient thickener to form a water having a viscosity of from about 1.5 to about 10 centipoises. Optionally, the alkaline aqueous slurry can include a synthetic fiber or polyolefin pulp from about 1 to about 10 percent by weight total solids. The synthetic polymer fiber or polyolefin pulp can be polyethylene or polypropylene fibers.

In yet another aspect, the present invention is a product formed by the foregoing process.

DETAILED DESCRIPTION OF THE INVENTION

The improved process of this invention generally employs an aqueous medium, a heat fusible organic polymer, a reinforcement material and characteristically a binder comprising an aqueous dispersion of a salt of an ethylene acrylic acid copolymer.

In the improved process a dilute alkaline aqueous slurry is prepared comprising the subject binder compound and other ingredients generally employed in the preparation of reinforced polymer composites, i.e., random fiber polymeric composites. The subject process is characterized in that no flocculant is added to destabilize or coagulate the dispersion. Typically, in the process a dilute alkaline aqueous slurry is prepared containing the subject binder, a heat fusible organic polymer and a reinforcement material, the pH of the resulting mixture is then adjusted to destabilize the mixture. The resulting composite product is dewatered and collected on a porous support and allowed to form a wet mat. The wet mat is then dried in a heated oven. Optionally, the wet mat can be dried by passing through a series of heated drier rolls to obtain a dried mat. The dried mat can then be rolled onto a cylinder or collected as a flat sheet. The dried mat can then be subjected to various treatments for the intended use such as compression molding into articles of manufacture.

Generally, the binder of the subject invention is a salt of an ethylene acrylic acid copolymer having an acrylic acid content from about 12 to about 30 percent by weight copolymer solids. Preferably, the acid content is 20 percent by weight copolymer solids. The copolymer is conveniently dispersed in an aqueous phase when present as an aqueous ammonium dispersion or aqueous alkali metal dispersion to form their respective salts.

For example, the ethylene acrylic acid copolymer is stabilized in aqueous dispersions as characterized by the following structural diagram:

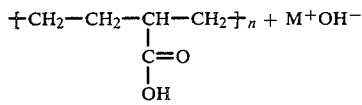

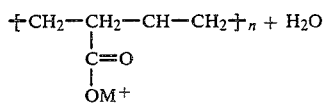

wherein M+ is NH$_4$+, Na+, K+, Li+, etc. Preferably, the ethylene acrylic acid is dispersed in an aqueous ammonium dispersion where M+ is NH$_4$+.

A suitable binder is commercially available through The Dow Chemical Company under the trademark Primacor® which is a high melt index (300 to 3,000) ethylene acrylic acid copolymer in an aqueous ammonium dispersion or an aqueous alkali metal dispersion having a variable acid content of 15–20 percent by weight copolymer solids.

The subject copolymer binder and other ingredients are dispersed in an alkaline aqueous medium such as water. Preferably, a thickened water medium is employed. The thickened water medium is advantageous for uniformily dispersing the ingredients of the polymer composite. Thickeners which can be added to the water are methylcellulose, carboxymethylcellulose, polymers of acrylamides, gums, or clays to name a few. One such thickener is commercially available from Kelco Company under the trademark Kelzan®, a xanthan gum. Thickened aqueous mediums have been found to be beneficial in augmenting the physical properties of the final reinforced polymeric product. The beneficial effects are believed to be due to the better dispersion obtained in the mixing step. Therefore, thickened aqueous mediums are preferred. Thickened aqueous mediums having a viscosity above 1 centipoise are preferred (as measured by Brookfield LVDT at 12 rpm). More preferable are viscosities from about 1.5 to about 10 centipoises.

The aqueous medium is pH adjusted such that the subject copolymer binder is stabilized when dispersed therein. Stabilization is generally achieved when the aqueous medium is at an alkaline state, i.e., pH value greater than 7.0. Adjustments can be made depending on the acid content of the particular copolymer binder employed. Typical compounds such as ammonium hydroxide, sodium hydroxide, sodium carbonate, sodium bicarbonate and corresponding potassium compounds can be employed to effect this pH adjustment.

The heat fusible organic polymers which can be employed in the subject invention are those polymer particles which are capable of deformation under heat and/or pressure to join into a unitary structure. These heat fusible polymers can be either thermoplastic or thermoset resins. The heat-fusible organic polymer component is desirably a hydrophobic; water-insoluble polymer. These polymers may be in the form of either powders or dispersions. Suitable heat-fusible organic polymers are polyethylene, chlorinated polyethylene, polycarbonates, nylon, styrene homopolymers and copolymers. Other suitable heat fusible organic polymers are disclosed in U.S. Pat. No. 4,426,470 herein incorporated by reference. The polymers are generally employed in an amount of from about 19 to about 79 percent by weight of the solids, dry weight basis.

The reinforcement materials include both organic and inorganic products such as glass, graphite, metal fibers or metal coated glass or graphite fibers, aromatic polyamides, cellulose and polyolefin fibers. Preferably glass fibers are employed such as chopped glass having a length of about ⅛ to 1 inch (about 3.2 to 25.4 mm) and/or milled glass fibers having a length of about 1/32 to ⅛ inch (about 0.79 to 3.2 mm). Other reinforcement materials are disclosed in U.S. Pat. No. 4,426,470 herein incorporated by reference. The reinforcement material generally comprises from about 10 to about 80 weight percent of the solids, dry weight basis.

Additionally, the polymeric composite can comprise a variety of other ingredients. Minor amounts of from about 10–33 percent by weight of the solids, dry weight basis, of fillers such as silica compounds CaCo$_3$, MgO, CaSiO$_3$ (wollastonite) and mica can be incorporated. Optionally, pigments and dyes can be employed to impart color or opacity. Preservatives can also be added such as UV stabilizers and antioxidants. Other chemical additives such as foaming agents, anti-foaming agents, bacteriocides, electromagnetic radiation absorption agents, etc. can be employed depending on the desired article to be produced.

In particular, the optional addition of low levels of synthetic polymeric fibers or polyolefin pastes or pulp have been found to be advantageous in the preparation of the polymeric composite. For example, polyaramid pulp additives are generally disclosed in French Patent 2507123-A as contributing to the cohesive properties of the composite. Other typical polymeric fibers are polyethylene, polypropylene, polyvinylchloride, polyester, polystyrene and ABS (acrylonitrile-butadiene-styrene copolymer). One preferred polymeric fiber is commercially available from Himont Corporation under the trademark Pulpex E® for polyethylene fibers and the trademark of Pulpex P® for polypropylene fibers. Generally, the polymeric fibers are present from about 1 to about 10 preferably from about 3 to about 5 weight percent based on total solids.

Generally, the improved process of the invention is conveniently and preferably carried out by first stirring the reinforcing material in the pH adjusted aqueous medium, preferably thickened water, until a uniform aqueous dispersion is obtained. The subject binder is then slowly added, followed by the gradual addition of the heat fusible polymer. All additions are made with stirring in order to form a uniform dispersion. Once all ingredients are uniformily dispersed, including any additional ingredients, the pH of the dispersion is adjusted to destabilize the system causing the composite ingredients to agglomerate such that they can be collected and formed into a sheet.

Typically, the final pH adjustment to destabilize the system is carried out by the incremental additions of an acid. Generally such acid compounds as mineral acids such as sulfuric, nitric, hydrochloric, phosphoric and organic acids, such as carboxylic (acetic formic, benzoic, salicylic) and dicarboxylic (oxalic, phthalic, adipic) and the like are added to lower the pH value of the dispersion to below 7.0. In the acid environment the subject copolymer binder is destabilized which causes the aqueous dispersion to coagulate. The pH adjusted aqueous dispersion can then be dewatered and formed into a sheet or web. The sheet forming and dewatering process can be accomplished by an aqueous wet-laid apparatus such as a sheet mold or Fourdriner or cylinder type paper machines. Optionally, a flocculant can be added to assist in the destabilization of the aqueous dispersion; however, this should not be necessary except where a more rapid flocculation is desired. Exemplary flocculants would be those suitable for anionic systems such as partially hydrolyzed cationic polyacrylamides.

After the composite is formed into a dewatered sheet and dried, it may be desirable to densify the sheet by pressing it with a flat press or by sending it through calendering rolls. Densification after drying of the composite is advantageous for increasing the tensile and tear strength of the reinforced composites. Drying of the sheet may be either air drying at ambient conditions or oven drying.

The invention is further illustrated by the following examples. All weights are dry weights unless otherwise indicated. Example I demonstrates the preparation of a random fiber polymeric composite where the aqueous dispersion is coagulated by adjusting the pH value from 8.0 to 4.0.

EXAMPLE I

To 28 liters of water adjusted to a pH value of 8.0 with NH$_4$OH was added 98 g of chopped glass fibers 3/16 inch (4.8 mm) length with mixing for 6 minutes, and 8.4 g of a polyethylene fiber with mixing for 2 minutes. To this mixture was added 159.6 g of a high density polyethylene (melt index 6.0) heat fusible polymer and 56 g of a 25 percent solids aqueous dispersion of an ammonium salt of ethylene acrylic acid copolymer having 20 percent active acid by weight copolymer solids. The total aqueous dispersion was mixed for an additional minute and then the pH was adjusted to 4.0 with dilute acetic acid to destabilize the dispersion into a slurry. The slurry solids were collected, dried and compression molded into a sheet having a final density of 1.20 g/cc and an average glass content of 41.75 percent by weight total sheet. The molding schedule was as follows: 3.5 minutes at 160° C. under contact pressure and then 1.5 minutes at 160° C. under 25,000 psig pressure.

The physical properties of the molded sheet prepared from Example I were measured. The values listed for Example I in Table I are the average of four test samples.

Example II as follows demonstrates the preparation of a random fiber polymeric composite in thickened water by adjusting the pH value of the dispersion from 10.0 to 4.0 but with the addition of flocculant to increase the rate of coagulation.

EXAMPLE II

A polymeric composite was prepared by first adjusting the pH of 28 liters of thickened water to 10.0 with ammonium hydroxide. The water was thickened by the addition of 1.0 g Kelzan®, xanthan gum. To the pH adjusted thickened water was added 92.4 g (dry wet) of chopped wet glass fibers 3/16 inch (4.8 mm) in length (fibers contained 10 percent water) with mixing for 1 minute and 8.4 g of a polyethylene fiber with mixing for 2 minutes. To this dispersion was admixed for 2 minutes, 173.6 g of high density polyethylene (melt index 6.0) as the heat fusible polymer and 56 g of a 25 percent dispersion of an ammonium salt of ethylene acrylic acid copolymer having 20 percent active acid by weight copolymer solids. The aqueous dispersion was then adjusted to a pH value of 4.0 with dilute acetic acid and while mixing 25 g of a 0.5 percent aqueous solution of flocculant Betz® 1260, commercially available from Betz Laboratories, was added to speed coagulation. The slurry so formed was then collected, dried and compression molded into a sheet having a density of 1.20 gm/cc and an average glass content of 36.15 percent by weight total sheet. The molding schedule was as follows: 3.5 minutes at 180° C. under 5 ton ram pressure; 1.5 minutes at 180° C. under 25 ton ram pressure; and cooled 3.5 minutes while under pressure and released.

The physical properties of the sheet prepared from Example II were measured. The values listed for Example II in Table I are the average of four test samples.

EXAMPLE III

A polymeric composition was prepared by adding 103.6 g of glass fibers, ½ inch (12.7 mm) in length to 28 liters of thickened water with mixing for 6 minutes. The water was thickened with 1 g of Kelzan®, xanthan gum. Next, 8.4 g of Pulpex P®, polypropylene fibers, was added to the aqueous dispersion of glass fibers and the pH of the entire mixture was adjusted to 8.0 with ammonium hydroxide. To the alkaline aqueous dispersion was added 158.2 g of ground polypropylene and 39.2 g of a 25 percent solids aqueous dispersion of an ammonium salt of ethylene acrylic acid copolymer having 20 percent active acid by weight copolymer solids. The total aqueous dispersion was mixed for an additional minute and then the pH was adjusted to 4.0 with dilute acetic acid to destabilize the dispersion. The solids were collected, dried and compression molded into a sheet having a final density of 1.16 g/cc and an average glass content of 37.8 percent by weight total sheet. The molding schedule was as follows: 3.5 minutes at 225° C. under contact pressure, 1.5 minutes under 25 tons ram pressure, cooled for 5 minutes under 25 tons ram pressure and released.

The physical properties of the molded sheet prepared from Example III were measured. The values listed for Example III in Table I are the average of four test samples.

TABLE I

| | Standard Rigid Plastics Test (ASTM D-638) | | | | | | |
|---|---|---|---|---|---|---|---|
| | Young's Modulus (psi) | Tensile (psi) | Elongation (percent) | Breaking Strength (psi) | Flex Strength (psi) | Bending Modulus (psi) | Izod Notch Impact Strength (lb/inch notch) |
| Example I | $7.8 \times 10^5$ | 11732 | 1.9 | 11717 | 17614 | $7.64 \times 10^5$ | 7.6 |
| Example II* | $7.8 \times 10^5$ | 10235 | 4.0 | 10253 | 16107 | $7.59 \times 10^5$ | 5.0 |
| Example III | $7.8 \times 10^5$ | 11555 | 2.5 | 11419 | 17585 | $7.75 \times 10^5$ | 12.8 |

*Not an Example of the invention.

What is claimed is:

1. An improved process for preparing a reinforced polymeric composite in the absence of a flocculant comprising the steps of
    (a) forming an alkaline aqueous slurry comprising
        (i) a reinforcing material,
        (ii) a heat fusible organic polymer, and (iii) a binder comprising a salt of an ethylene acrylic acid copolymer having an acrylic acid content from about 12 to about 30 percent by weight copolymer solids; and (b) adjusting the pH value of said slurry such that said binder is destabilized to coagulate said slurry.

2. The process of claim 1 which includes the additional steps of:

(c) collecting said destabilized slurry in the form of a mat;

(d) dewatering; and (e) drying.

3. The process of claim 1 wherein said alkaline aqueous slurry is formed in thickened water.

4. The process of claim 3 wherein said thickened water is formed by adding sufficient thickener to form a water having a viscosity of from about 1.5 to about 10 centipoises.

5. The process of claim 1 wherein said alkaline aqueous slurry includes a synthetic polymeric fiber or polyolefin pulp from about 1 to about 10 percent by weight total solids.

6. The process of claim 5 wherein said synthetic polymer fiber or polyolefin pulp is polyethylene and/or polypropylene fibers.

7. The process of claim 1 wherein said reinforcing material is glass fibers.

8. The process of claim 1 wherein said binder is an ethylene acrylic acid copolymer wherein the acrylic acid content of the copolymer is 20 percent by weight copolymer solids.

9. The process of claim 1 wherein the pH of said alkaline aqueous slurry is adjusted by adding an acid in an amount sufficient to destabilize said binder.

10. The process of claim 9 wherein said acid is acetic acid.

11. A product formed by the process of claim 1.

* * * * *